US006134775A

United States Patent [19]

Castillo

[11] Patent Number: 6,134,775

[45] Date of Patent: Oct. 24, 2000

[54] DEVICE FOR APPLYING NAILING PLATES TO THE ENDS OF RAILROAD TIES AND NAILING PLATE DISPENSER THEREFOR

[75] Inventor: Adolfo Castillo, St. Charles, Mo.

[73] Assignee: MiTek Holdings, Inc., Wilmington, Del.

[21] Appl. No.: 08/868,421

[22] Filed: Jun. 3, 1997

[51] Int. Cl.$^{7}$ ...................................................... B23P 19/00

[52] U.S. Cl. ................................ 29/798; 29/771; 29/772; 29/809; 221/289; 221/297; 227/100; 227/152; 227/153; 227/48

[58] Field of Search .............................. 29/771, 772, 798, 29/809; 221/289, 297; 227/152, 153, 48, 39, 100

[56] References Cited

U.S. PATENT DOCUMENTS

| | | | |
|---|---|---|---|
| 3,877,608 | 4/1975 | Jureit et al. | 221/236 |
| 4,111,114 | 9/1978 | Carr | 100/100 |
| 4,178,671 | 12/1979 | Luttig | 104/16 |
| 4,271,980 | 6/1981 | Frieser et al. | 221/297 |
| 4,351,465 | 9/1982 | Moehlenpah et al. | 227/153 |
| 4,373,652 | 2/1983 | Matlock et al. | 227/100 |
| 4,494,685 | 1/1985 | Matlock | 227/152 |
| 4,504,006 | 3/1985 | Lollar, Sr. | 227/152 |
| 4,513,900 | 4/1985 | Matlock | 227/153 |
| 4,657,168 | 4/1987 | Matlock | 227/152 |
| 5,168,627 | 12/1992 | Owen | 29/897.34 |
| 5,528,807 | 6/1996 | Girouard, Sr. et al. | 29/798 |

*Primary Examiner*—David P. Bryant
*Assistant Examiner*—Jermie E. Cozart
*Attorney, Agent, or Firm*—Armstrong Teasdale LLP

[57] ABSTRACT

A device for applying nailing plates to the ends of wooden ties includes a plate feeder for applying nailing plates to the generally vertically-oriented ends of a wooden tie horizontally disposed therein. The plate feeder includes a frame on each side for holding a nailing plate in a generally vertical orientation adjacent one of the ends of the wooden tie, a dispenser associated with each frame for dispensing nailing plates to the frame; and a piston on each side actuable to partially press a nailing plate held in the frame into the ends of the wooden tie. A tie feeder for conveys ties to the plate feeder. There is also a press for pressing nailing plates partially embedded in the ends of a wooden tie, into the ends of the wooden tie. A conveyor conveys wooden ties from the plate feeder to the press.

14 Claims, 12 Drawing Sheets

(MIRROR)

(MIRROR)

DEVICE FOR APPLYING NAILING PLATES TO THE ENDS OF RAILROAD TIES AND NAILING PLATE DISPENSER THEREFOR

FIELD OF THE INVENTION

This invention relates to a device for applying nailing plates to the ends of wooden ties, and in particular to such a device for automatically applying and embedding nailing plates in the ends of wooden railroad ties.

BACKGROUND OF THE INVENTION

Nailing plates are often embedded in the ends of wooden railroad ties to help protect the ties from degradation, and particularly splitting. Machines have been developed to embed nailing plates in the ends of railroad ties. These machines first compress the ends of the ties and then drive pre-placed plates into the end. With the machines presently used, workers must first apply and partially embed the plates in the ends of the ties. This is labor intensive, and because it is done manually, the positioning of the plates varies and often is less than optimal.

SUMMARY OF THE INVENTION

The device of the present invention is adapted to automatically apply and partially embed nailing plates in spaced, generally vertical surfaces, such as the ends of wooden railroad ties, and then embed the nailing plates in the ends of the railroad ties. Generally the device comprises a tie feeder for conveying ties to a plate feeder; a plate feeder for applying nailing plates to the generally vertically-oriented ends of the wooden tie horizontally disposed therein; a conveyor for conveying wooden ties with partially embedded nailing plates applied to their opposite ends from the plate feeder to a press, and a press for fully embedding the nailing plates. The plate feeder preferably includes a frame on each side for holding a nailing plate in a generally vertical orientation adjacent one of the ends of the wooden tie, a dispenser associated with each frame for dispensing nailing plates to the frame; and a piston on each side actuable to partially press a nailing plate held in the frame into the end of the wooden tie.

The device of the present invention automatically applies nailing plates to the ends of railroad ties and partially embeds them in the ends of the ties so that the plates can be pressed into the ends. This eliminates the tedious, labor intensive task of manually placing these plates. Moreover the device achieves a more accurate and consistent placement of the plates in the ends of the ties. These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
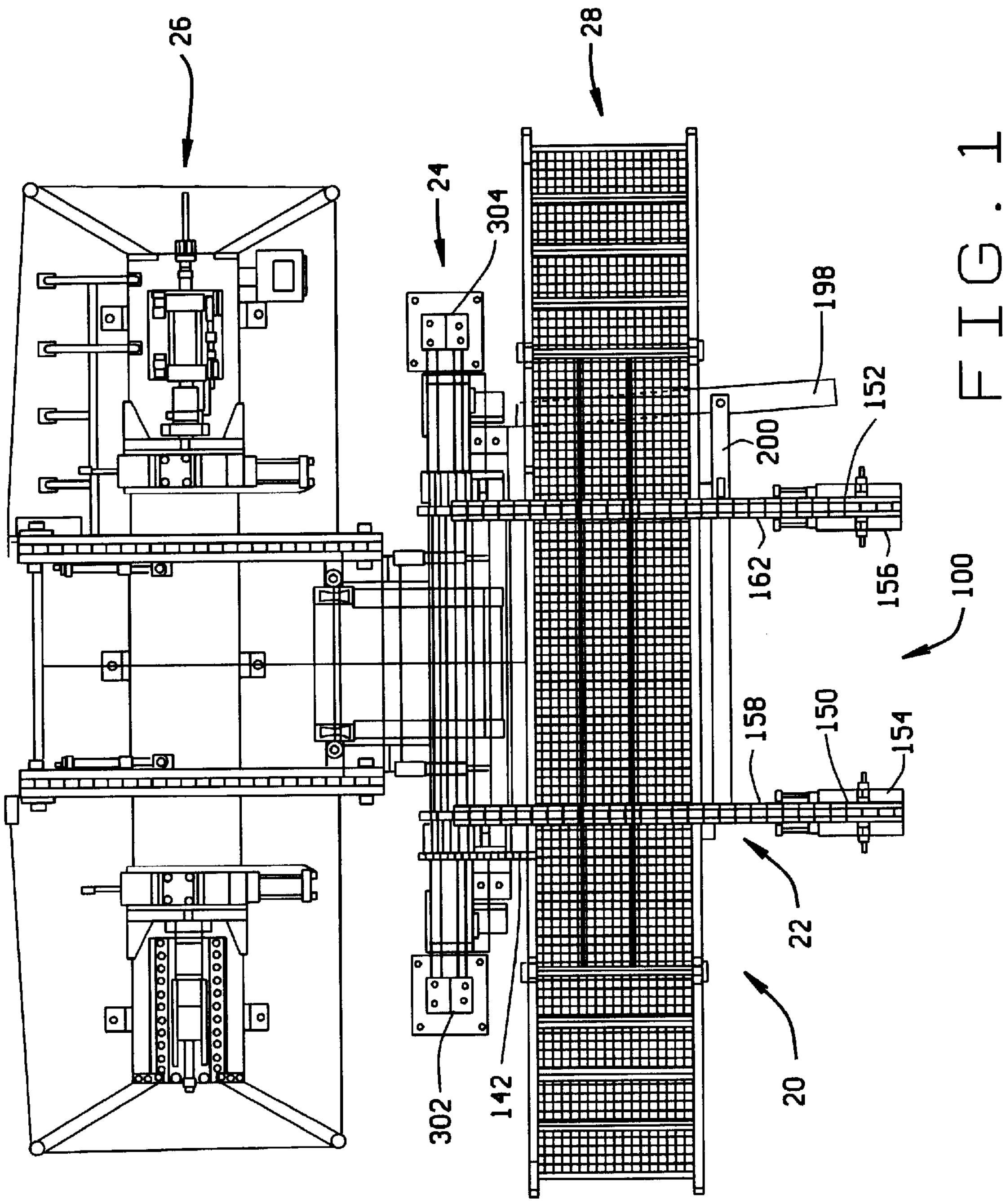
FIG. 1 is a top plan view of an apparatus for applying plates to the ends of railroad ties.
Figure 2:
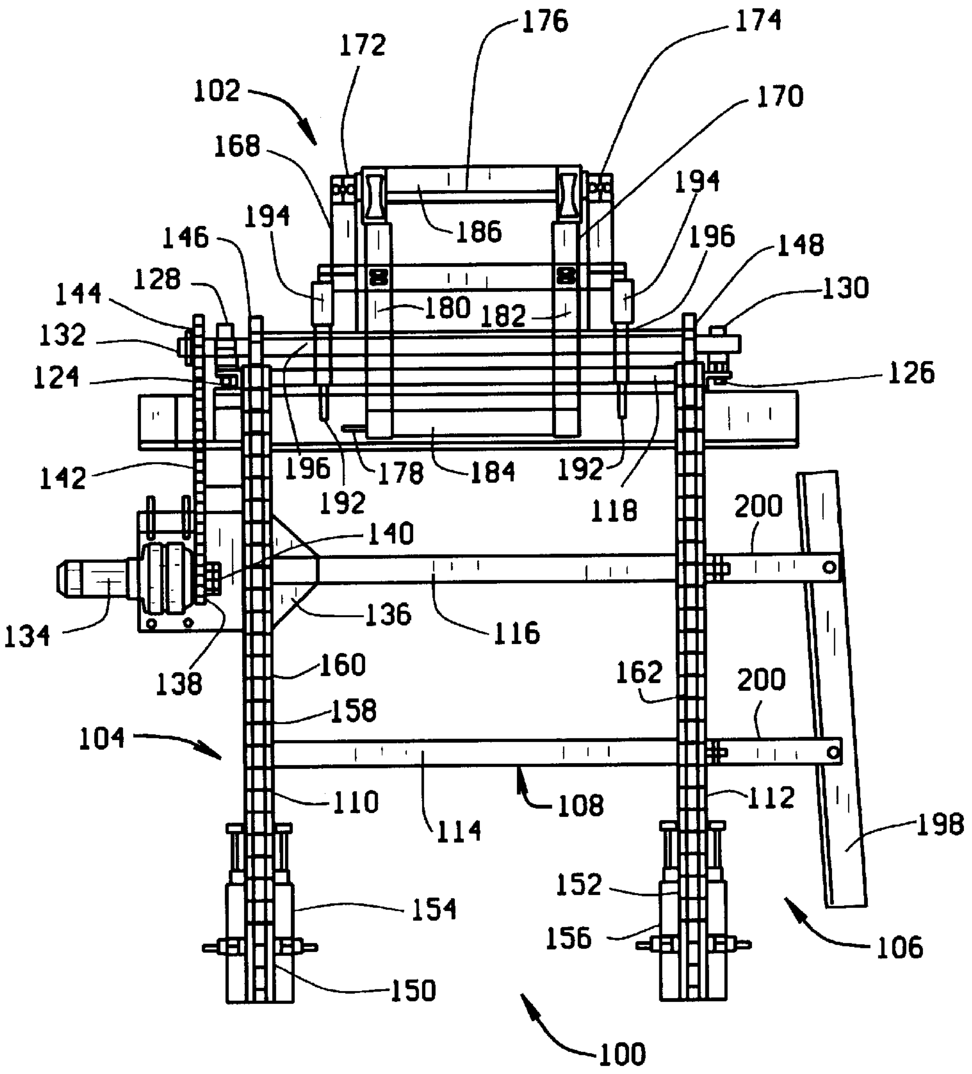
FIG. 2 is a top plan view of a tie feeder of the apparatus.
Figure 3:
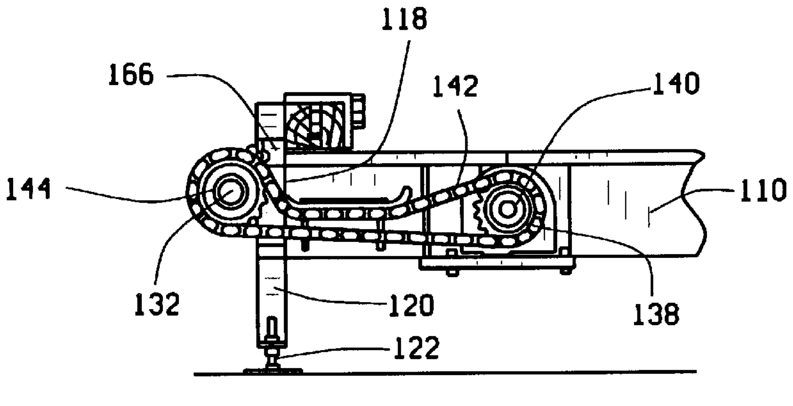
FIG. 3 is a partial right side elevation view of the tie feeder.
Figure 4:
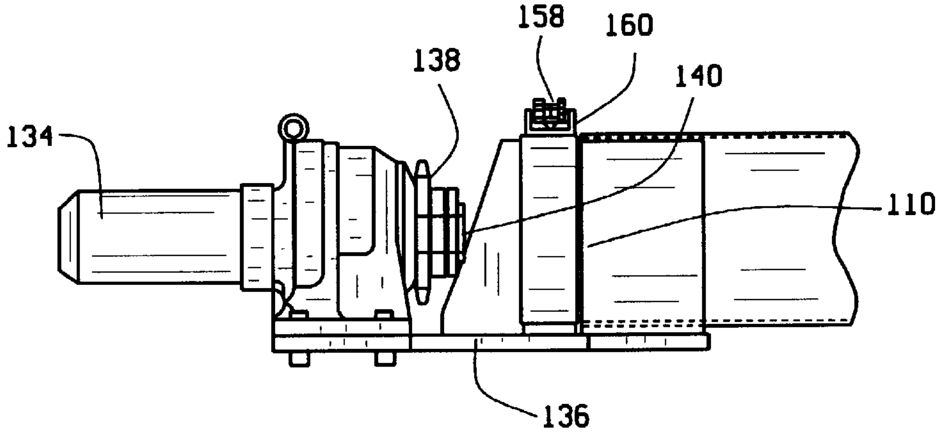
FIG. 4 is a partial transverse cross-sectional view of the feeder taken along the plane of line of 4—4 in FIG. 2.
Figure 5:
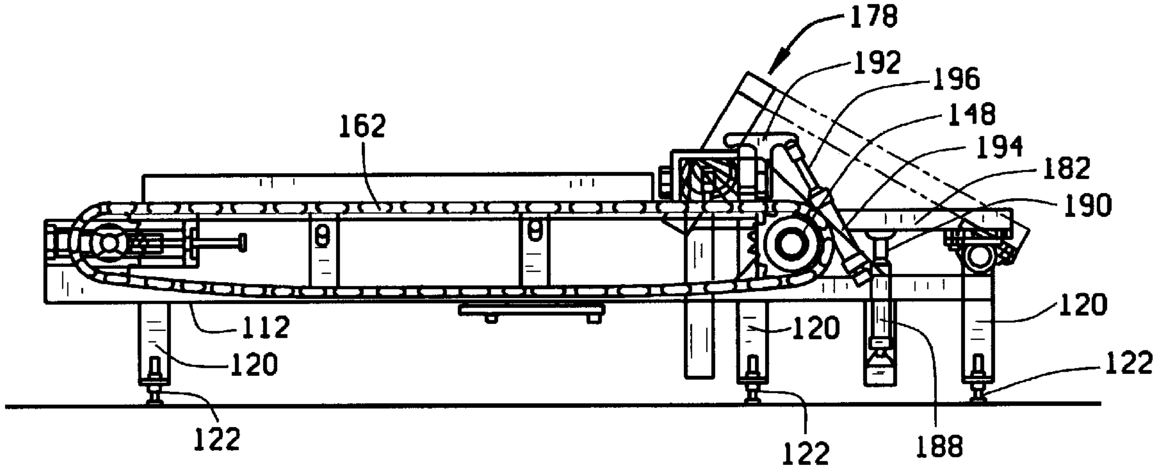
FIG. 5 is a longitudinal cross-sectional view of the tie feeder taken along the plane of line 5—5 in FIG. 2.
Figure 6:
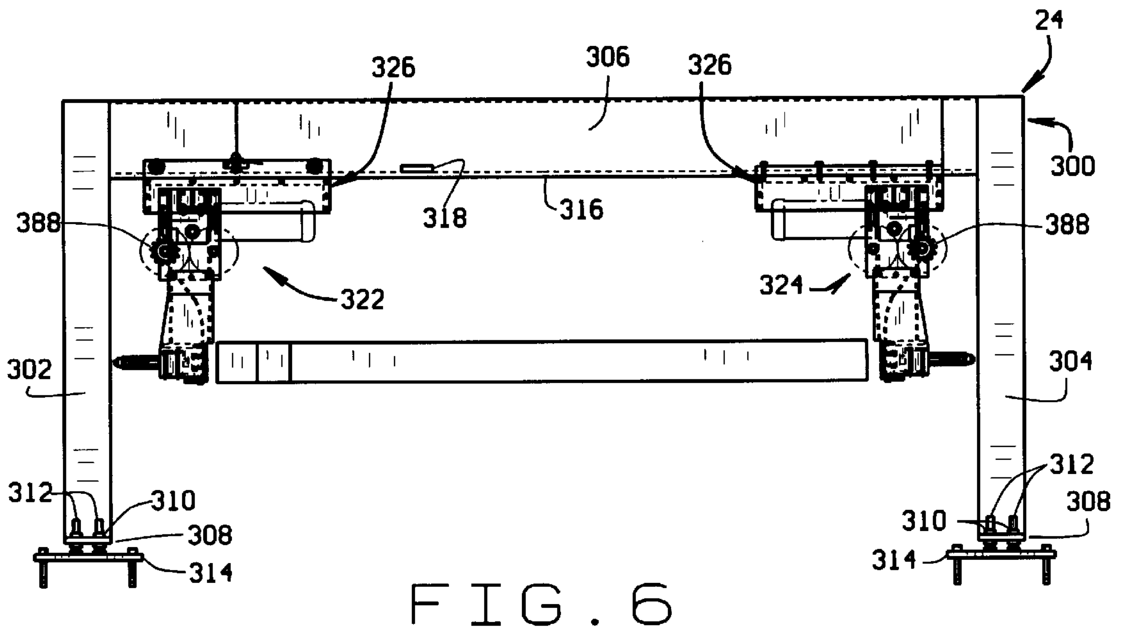
FIG. 6 is a front elevation view of the plate feeder of the apparatus.
Figure 7:
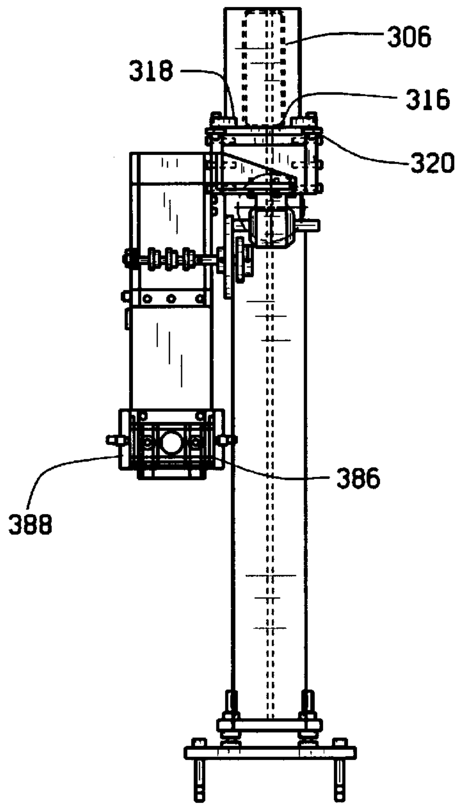
FIG. 7 is a right side elevation view of the plate feeder.
Figure 8:
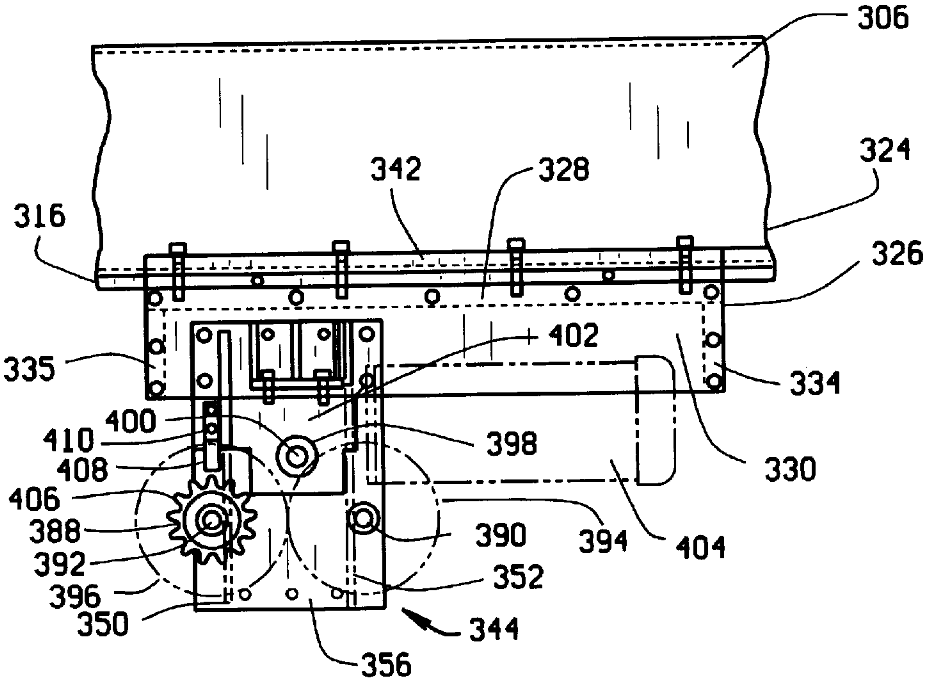
FIG. 8 is an enlarged partial rear elevation view of the stationary nailing plate dispenser.
Figure 9:
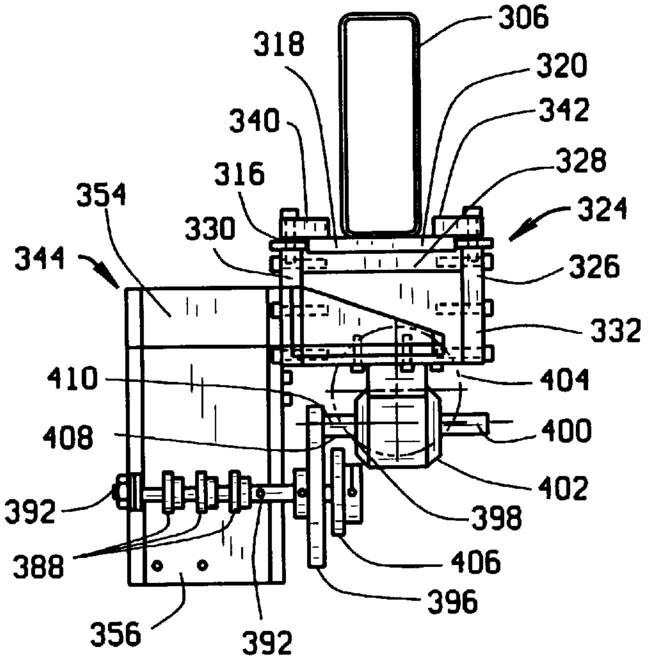
FIG. 9 is a partial left side elevation view of the stationary nailing plate dispenser taken along the plane of Line 9—9 in FIG. 8.
Figure 10:
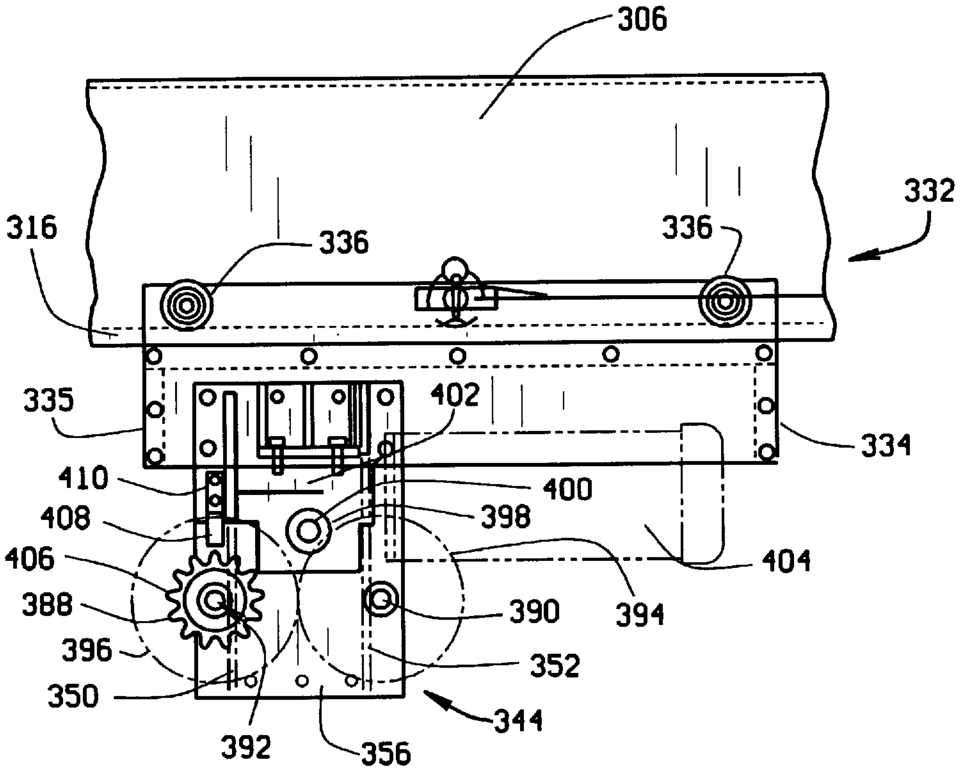
FIG. 10 is a partial rear elevation view of the adjustable nailing plate dispenser.
Figure 11:
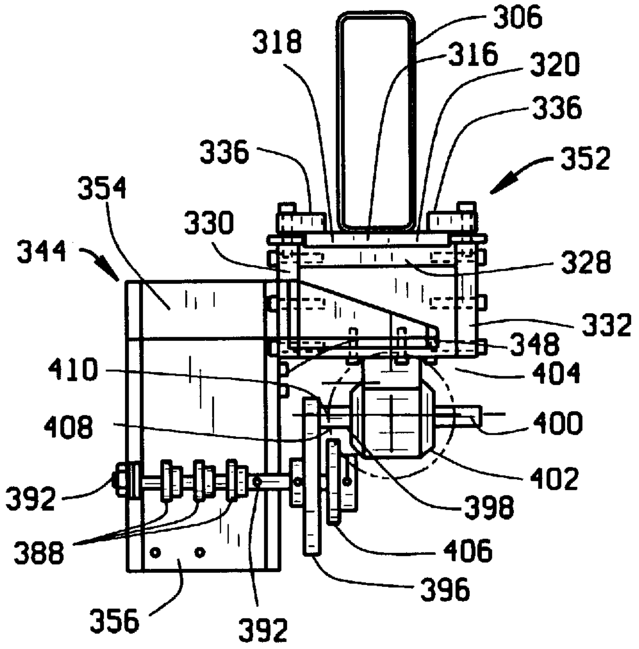
FIG. 11 is a partial right side elevation view of the adjustable nailing plate dispenser taken along the plane of line 11—11 in FIG. 9.
Figure 12:
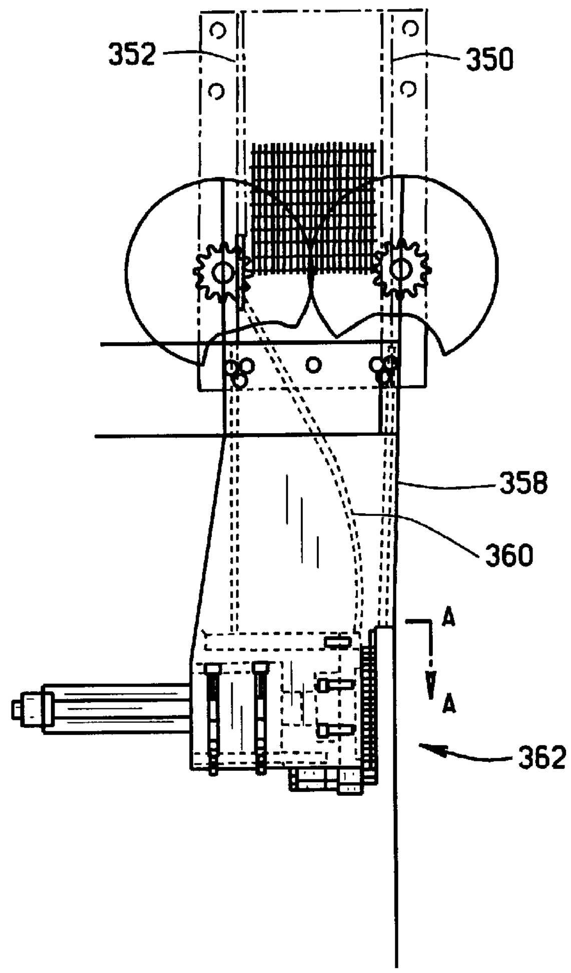
FIG. 12 is a rear elevation view of the stationary nailing plate dispenser, including the chute and frame.
Figure 13:
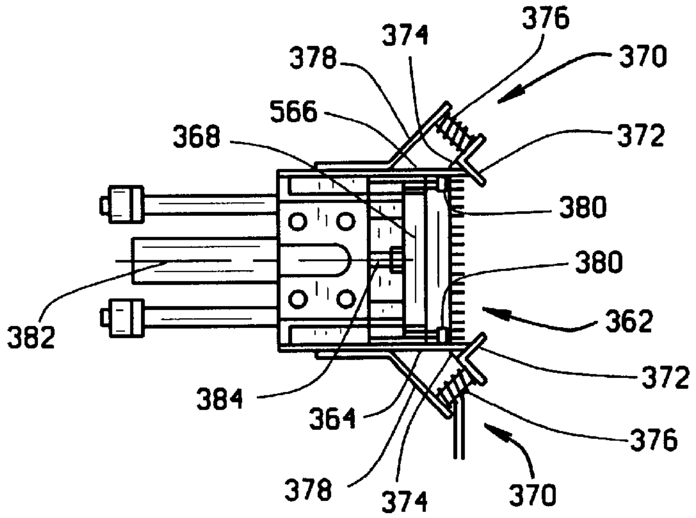
FIG. 13 is a horizontal cross-sectional view of the frame taken along the plane of line 13—13 in FIG. 12.

A device constructed according to the present invention for applying nailing plates to the ends of railroad ties is indicated generally as 20 in FIG. 1. The device 20 comprises a tie feeder 22, a plate feeder 24, and a plate press 26. A catwalk 28 can extend over the tie feeder 22, adjacent the plate feeder 24.

The tie feeder 22 has a front end 100 for receiving railroad ties, a back end 102 for discharging railroad ties, and left and right sides 104 and 106, respectively. The tie feeder 22 includes a frame 108 comprising left and right side beams 110 and 112, and a front beam 114, and intermediate beam 116, and a rear beam 118 which extend transversely between the side beams. The frame is supported by a plurality of legs 120, each mounting an adjustable foot 122 for leveling the tie feeder 22.

Angle irons 124 and 126 on the side beams 110 and 112 mount bearings 128 and 130 which rotatably mount shaft 132. A motor 134 is mounted on a plate 136 on the underside of the side beam 110 and intermediate beam 116. A drive gear 138 is mounted on the drive shaft 140 of motor 134, for driving chain 142 which drives gear 144 on the shaft 132.

Sprockets 146 and 148 are mounted on the shaft 132, adjacent the left and right sides 104 and 106 of the tie feeder. Idler sprockets 150 and 152 are mounted on the forward ends of side beams 110 and 112, with adjustable supports 154 and 156. A conveyor chain 158 loops around the sprockets 146 and 150, extending over the top of left side beam 110, in a U-shaped channel 160, and returns through the interior of the left side beam. Similarly, a conveyor chain 162 loops around the sprockets 148 and 152, extending over the top of right side beam 112, in a U-shaped channel 164, and returns through the interior of the right side beam. Adjustable supports 154 and 156 allow adjustment of the tension of the chains 158 and 162.

The motor 134 turns shaft 132, which drives conveyor chains 158 and 162 to move ties deposited at the front 100 of the tie feeder 22 to the rear of the top feeder, until the ties engage stop 166.

The frame 108 also includes arms 168 and 170 extending generally rearwardly from the rear beam 118. The rear ends of the arms 168 and 170 are supported by legs 120 and feet 122. Brackets 172 and 174 on the tops of the arms 168 and 170 mount an axle 176, on which swing gate 178 is pivotally mounted. The swing gate comprises left and right longitudinal elements 180 and 182, and front and rear transverse elements 184 and 186.

A first cylinder 188 is mounted on each of the arms 168 and 170, with the piston 190 of the cylinder 188 engaging one of the longitudinal elements 180 and 182 so that the cylinders can pivot swing gate 178 to lift a railroad tie abutting the stop 166 over the stop. The stem of a T-shaped clamp 192 is pivotally mounted to the rear beam 118, adjacent each of the arms 168 and 170. A second cylinder 194 is mounted on each of the arms 168 and 170, with the piston 196 of cylinder 194 engaging one of the legs of each of the T-shaped clamps 192 to pivot the T-shaped clamps and cause them to engage a railroad tie abutting the stop 166 to thereby hold the tie in place.

A railroad tie guide 198 is mounted on the right side 106 of the tie feeder 22 with supports 200 extending from the right side beam 110. The guide 198 may be an angle iron with an upright face that is sloped inwardly and rearwardly to engage the right end of a railroad tie being conveyed on the conveyor chains 158 and 162, to properly position the railroad tie in the left-right direction when the railroad tie reaches the stop 166.

The plate feeder 24 comprises a superstructure 300 comprising left and right posts 302 and 304 and top beam 306 extending between the upper ends of the posts. Each of the posts 302 and 304 is preferably a vertically extending I-beam, with a plate 308 secured to its lower end. Each post is mounted with nuts 310 on threaded rods 312 projecting from an anchor plate 314 secured to the floor. This allows the superstructure to be trued and leveled.

The top beam 306 is preferably a horizontally extending box beam with an elongate plate 316 secured to the underside of the box beam, with a first lip 318 and a second lip 320 projecting from the front and rear of the box beam. A first nailing plate dispenser unit 322 and a second nailing plate dispenser unit 324 are mounted on the left and right sides of the top beam 306. The dispenser units 322 and 324 are similar in construction, being mirror images of one another. The primary difference between the dispenser units is that unit 322 on the left side is slidably mounted on the top beam 306 while the unit 324 on the right side is fixedly mounted on the top beam. This allows the plate feeder to accommodate railroad ties of different sizes.

Each of the units 322 and 324 includes an elongate box-shaped bracket 326 with a top 328 that abuts the underside of elongate plate 316 front and back panels 330 and 332, inner and outer end panels 334 and 335. In unit 322, rollers 336 are mounted on the front and back panels 330 and 332 to roll on the upper surfaces of the lips 318 and 320 formed by plate 316 to allow the unit to move left or right to accommodate railroad ties of different lengths. (Railroad ties are typically 8 feet, 8½ feet, or 9 feet long, and the units 322 and 324 are preferably spaced to allow a two inch gap between the end of the railroad tie and the unit.) In unit 324, bars 340 and 342 are mounted on the front and back panels 330 and 332, to sandwich the lips 318 and 320 of the plate 316 between the bottom surfaces of the bars and the top surface of the top panel 328.

Figure 14A:
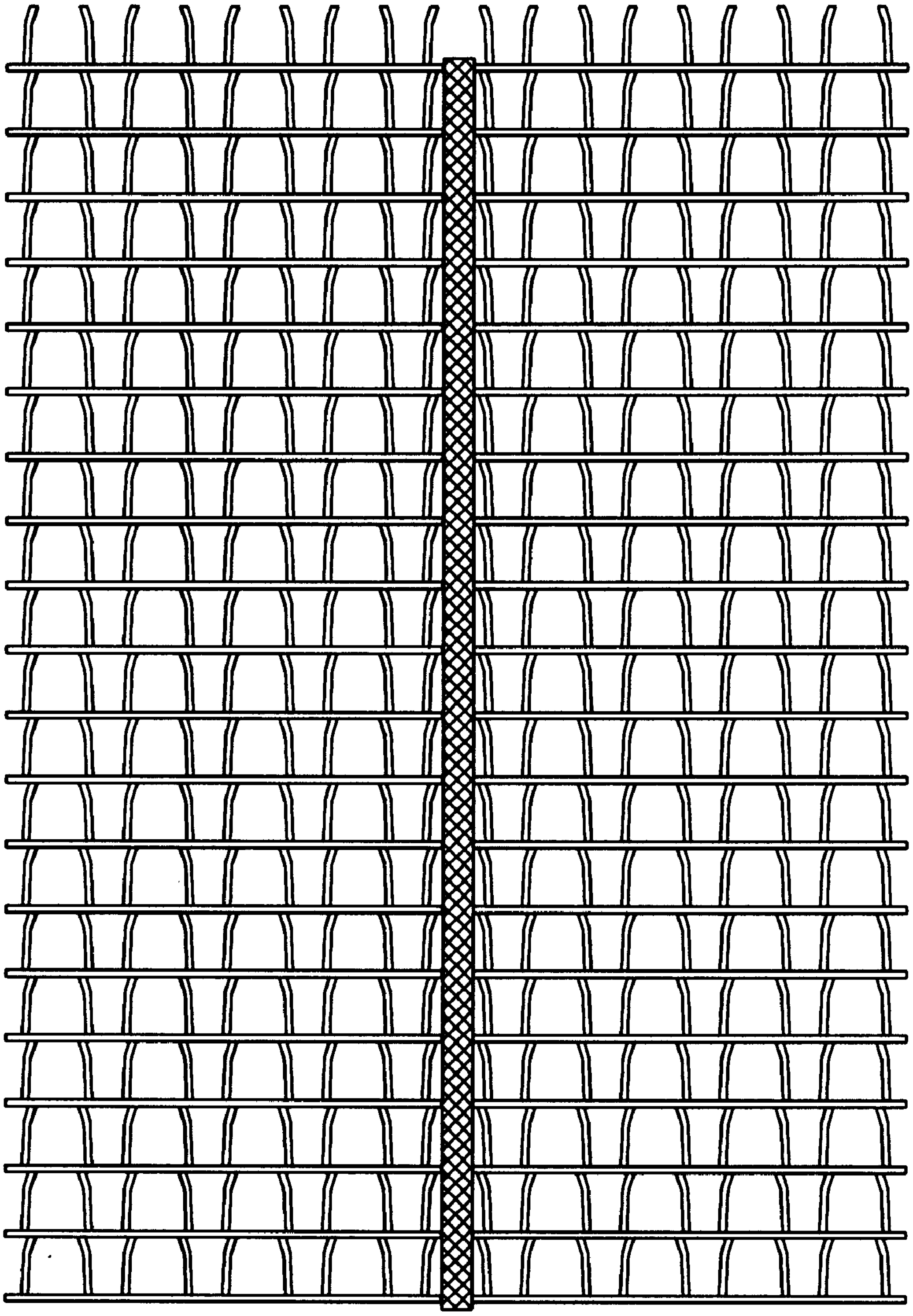
FIG. 14*a* is a front elevation view of vertical stack of nailing plates that can be loaded into the hopper of the plate feeder.
Figure 14B:
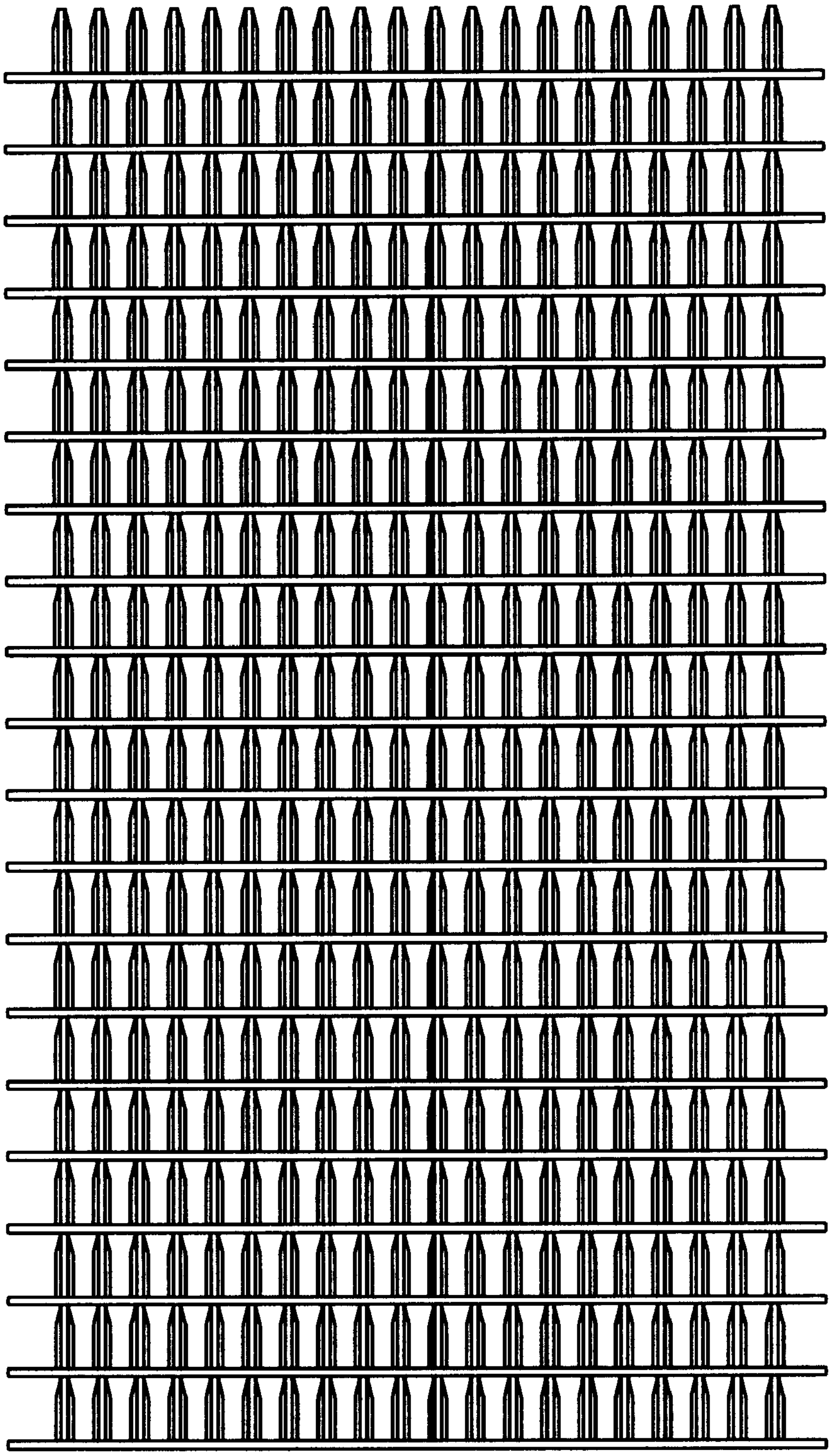
FIG. 14*b* is a side elevation view of the stack of nailing plates.

A hopper 344 is mounted on the front panel 330 of the bracket 326. The hopper 344 has a generally rectangular horizontal cross section with a front 346, a back 348, and inner and outer sides 350 and 352. The hopper 344 is sized to receive a generally vertically oriented stack of standard nailing plates (arranged with the tips of the nails pointing inwardly), for example MITEK® PowRR™ Band plates, to be applied to the ends of the railroad ties. Such a stack of nailing plates is shown in FIGS. 14*a* and 14*b*. The hopper 344 has an open top 354 for loading nailing plates, and a discharge opening 356 at the bottom. A chute 358 extends from the bottom of the hopper, and has a nailing plate guide 360 that turns nailing plates discharged through the discharge opening 356 from the generally horizontal orientation in which they are discharged to a generally vertical orientation with the tips of the nails pointing inwardly, and delivering the nailing plates to frame 362 for releasably holding the nailing plate in a generally vertical orientation prior to partially embedding the nailing plate in the end of a railroad tie.

The frame 362 comprises front and back panels 364 and 366, a back plate 368, and a gripper 370 on the front and back panels 364 and 366 to retain a nailing plate against the plate 368, between the front and back panels. The grippers 370 can comprise sections of angle iron 372 pivotally mounted at their vertexes 374 to the front and rear panels 364 and 366. The angle iron 372 can be resiliently biased with springs 376 between the angle iron and tabs 378 on the front and rear panels 364 and 366. The back plate 368 can include magnets 380 to releasably retain nailing plates on the back plate.

The frame 362 also comprises a cylinder 382 whose piston 384 is connected to plate 368 to push a nailing plate from the frame, past the resilient grippers 370 and partially into the generally vertical end face of a railroad tie held by the feeder 22 adjacent the frame 362.

The dispensers 322 and 324 also include a metering devices for metering nailing plates individually from the hopper 344 through the discharge opening 356. This metering device preferably comprises sprockets which can engage the edges of a nailing plate between their teeth. In this preferred embodiment there are three inside sprockets 386 on the inside side of the hopper 344 and three outside sprockets 388 on the outside side of the hopper. The sprockets 386 and 388 are mounted on shafts 390 and 392 on the outside of the hopper. The teeth of the sprockets extend through the walls of the hopper where adjacent teeth can engage the edge margins of a nailing plate in the hopper. Mating gears 394 and 396 are mounted on the shafts 390 and 392, and are driven by a pinion 398 engaging gear 394. The gears turn the shafts in unison, which turn the sprockets 386 and 388 to individually dispense nailing plates through the discharge opening 356. The pinion 398 is mounted on the output shaft 400 of a speed reducer 402, which is driven by electric motor 404 mounted under the box shaped bracket 326.

A proximity sprocket 406 is mounted on the shaft 392 and turns with the shaft. A proximity sensor 408 is mounted on a bracket 410 adjacent the sprocket 406 and can sense the passing of the teeth on the sprocket 406. The number of teeth on sprocket 406 and the sprockets 386 and 388 are selected so that the proximity sensor can detect the release of a single nailing plate by the passing teeth of the sprocket 406.

Figure 15:
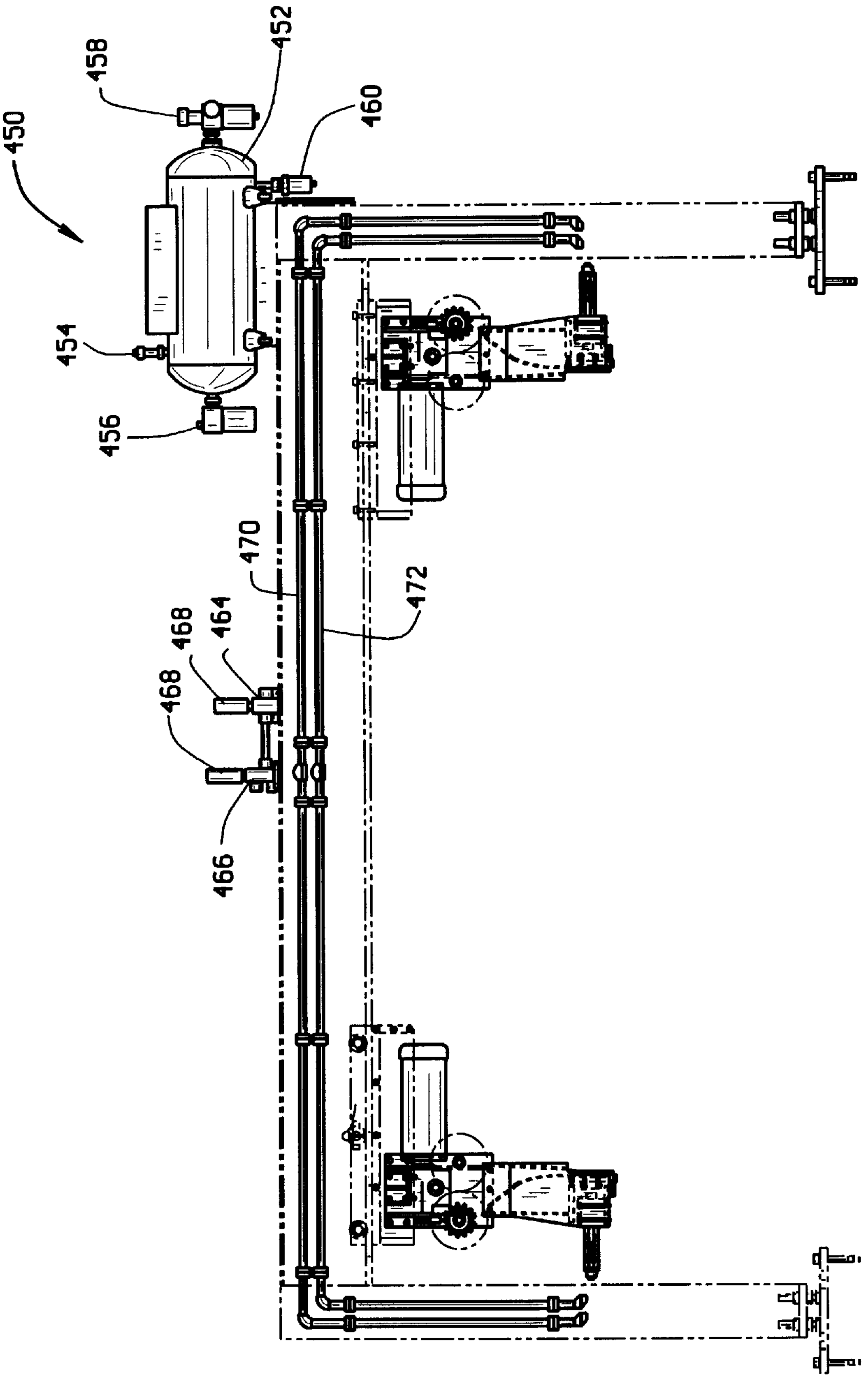
FIG. 15 is a front elevation view of the plate feeder, similar to FIG. 6, but showing the pneumatic system for actuating the cylinders of the dispensers.
Figure 16:
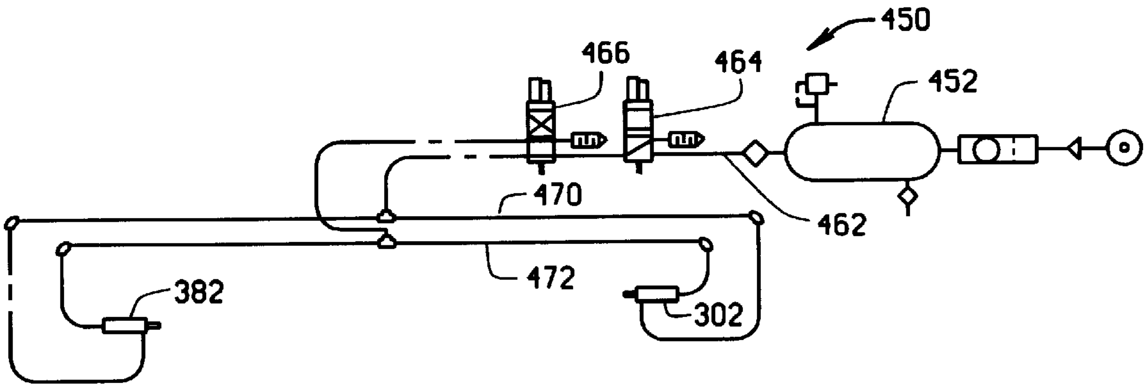
FIG. 16 is a schematic view of the pneumatic system shown in FIG. 15.

The pneumatic system 450 for operating the cylinders 382 is shown in FIGS. 15 and 16. This system comprises an air tank 452 that is fitted with a safety valve 454, an air line lubricator 456, an air line filter/regulator 458, and an automatic drain 460. A pneumatic line 462 extends from the air tank to a three-way, two position air valve 464, which is connected to a four-way, two position air valve 466. Each of the air valves is provided with an air muffler 468. There are two parallel pneumatic lines 470 and 472 extending between the cylinders 382 on each side. The air valve 466 is connected to each of the pneumatic lines so that the air valves 464 and 466 extend and retract the pistons 384 of the cylinders 382.

Figure 17:
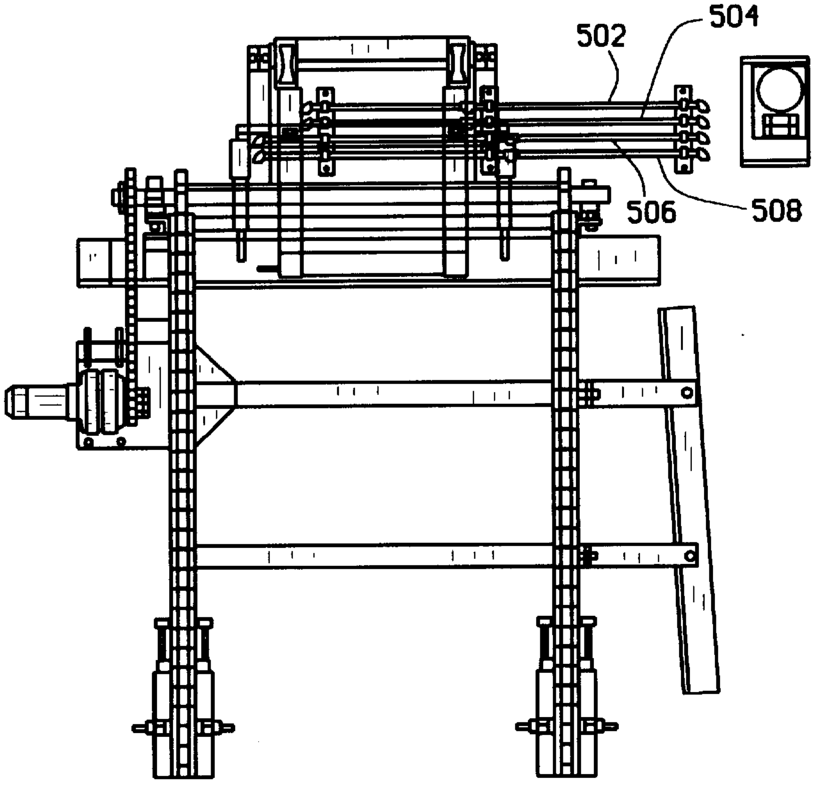
FIG. 17 is a top plan view of the tie feeder, similar to FIG. 2, but showing the hydraulic system for actuating the cylinders on the lift gate and t-shaped clamps.
Figure 18:
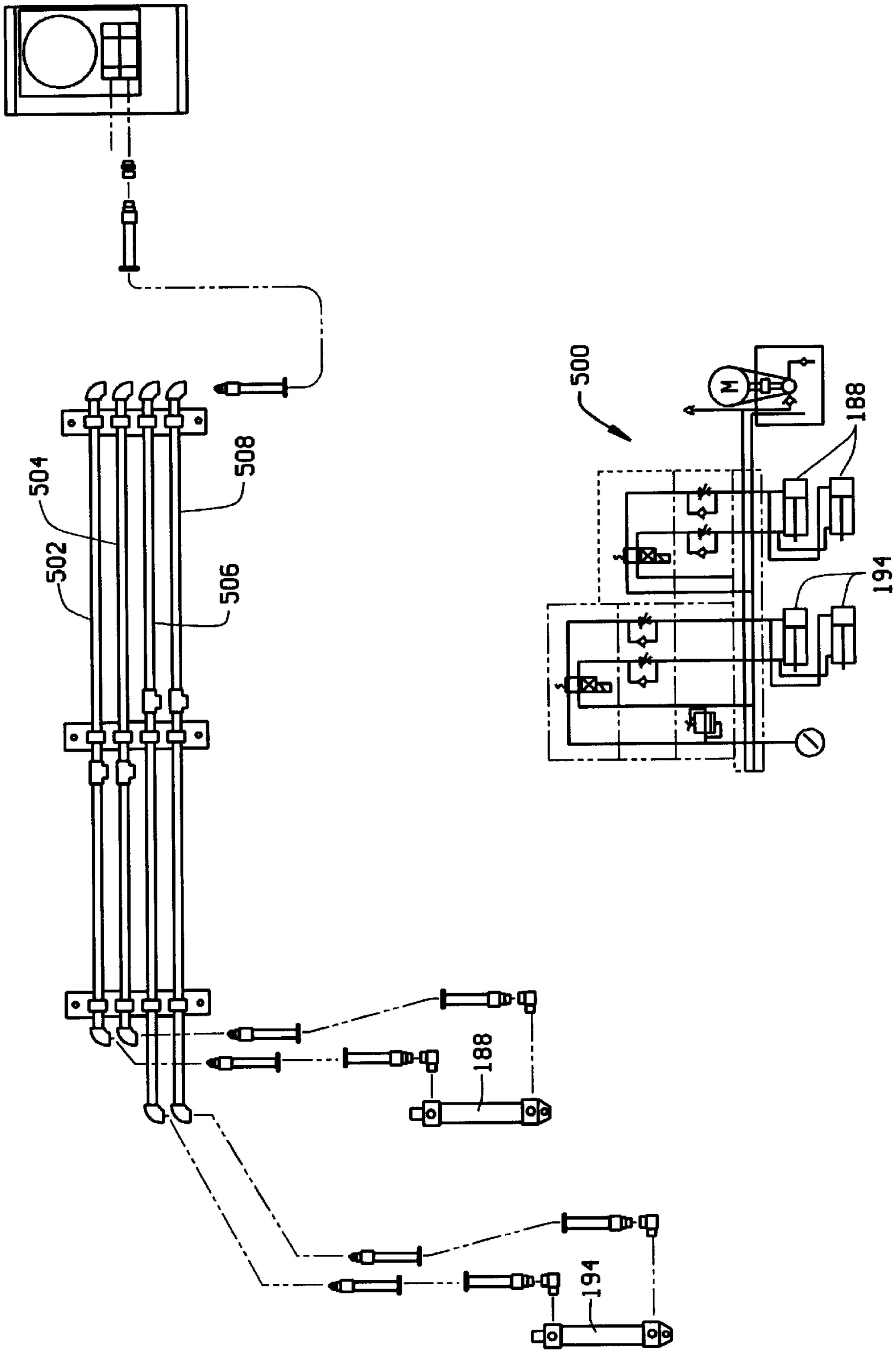
FIG. 18 is a schematic view of the hydraulic system shown in FIG. 17.

The hydraulic system 500 for operating the tie feeder 22 is shown in FIGS. 17 and 18. This system comprises a hydraulic power unit connected to four hydraulic lines, a first line 502, a second line 504, a third 506 and a fourth line 508.

Lines 502 and 504 are connected to the cylinders 188 to raise and lower the swing gate 178. Lines 506 and 508 are connected to the cylinders 194 to operate the T-shaped clamps 192 to engage and compress the railroad ties.

OPERATION

In operation, a railroad tie is deposited on the tie feeder 22. The motor 134 drives the conveyor chains 158 and 162 which carry the tie from the front 100 of the tie feeder to the back 102. The right end of the tie engages the guide 198 which pushes the tie from right to left as the tie advances to properly position the tie on the tie feeder against the stop 166.

Position sensors detect when there is a tie is present adjacent the stop 166 and cause the cylinder 194 to activate pistons 196 to cause T-shaped clamps 192 to engage the railroad tie, to hold it in place.

The nailing plate dispenser units 322 and 324 then dispense and apply a nailing plate to each end of the railroad tie. The motor 404 drives speed reducer 402 to turn pinion 398 on output shaft 400. The pinion drives gears 394 and 396, which turn shafts 390 and 392 turning the sprockets 386 and 388. The turning of the sprockets 386 and 388 causes the sprockets to engage the edge margins of the bottom-most nailing plate in the hopper 344, and move the nailing plate through the discharge opening 356. The proximity sensor 408 and sprocket 406 detect when the sprockets 386 and 388 have turned sufficiently to discharge a nailing plate, and stop motor 404.

A nail plate discharged through the discharge opening 356 in the hopper 344 falls through chute 358. Guide 360 in chute 358 turns the nailing plate from its generally horizontal orientation to a generally vertical orientation. The nailing plate slides down the guide 360 into the space in the frame 362 between the front and back panels 364 and 366, and between the back plate 368 and the grippers 370. The frame 362 holds the nailing plate in a generally vertical orientation spaced from the generally vertical end of the railroad tie. The piston 384 of cylinder 382 pushes the back plate 368 and nailing plate through the grippers 370 to partially embed the nailing plate into the end of the railroad tie.

Once the nailing plates have been properly positioned in the centers of the ends of the railroad ties, the tie feeder dumps the railroad tie onto the plate press 26, which fully embeds the nailing plate into the ends of the railroad tie. The pistons 190 of cylinders 188 operate to raise swing gate 178. This lifts the railroad tie over the stop 166, and allows it to slide down the sloped surface of the swing gate 178, and onto the chain feeder of the press 26.

What is claimed is:

1. A device for applying nailing plates to ends of wooden ties, the wooden ties orientated so that the ends are in a generally vertically-orientated position, the device comprising:

- a plate feeder for applying nailing plates to the generally vertically-oriented ends of a wooden tie horizontally disposed therein, the plate feeder including a frame on each side for holding a nailing plate in a generally vertical orientation adjacent one of the ends of the wooden tie, a dispenser associated with each frame for dispensing nailing plates to the frame; and a piston on each side actuable to partially press a nailing plate held in the frame into the adjacent end of the wooden tie, each dispenser comprising a chute configured to turn a generally horizontally disposed nailing plate to a generally vertical orientation and deliver the nailing plate to the frame.

2. The device according to claim 1 further comprising a press for pressing nailing plates that have been partially embedded in the ends of a wooden tie, into the ends of the wooden tie; and a conveyor for conveying wooden ties from the plate feeder to the press.

3. The device according to claim 2 further comprising a tie feeder for conveying ties to the plate feeder.

4. The device according to claim 1 wherein each frame comprises resilient grippers for releasably holding a nailing plate therein.

5. The device according to claim 1 wherein each dispenser comprises a bin for holding a vertical stack of generally horizontally disposed nailing plates, the bin having a discharge opening at the bottom for discharging nailing plates, and toothed sprockets on opposite sides of the discharge opening, the sprockets engaging the edges of the bottom nailing plate in the stack between the teeth on the sprockets and turning in registration to move the nailing plate out of the bin through the discharge opening.

6. The device according to claim 5 wherein one nailing plate dispenser unit is slidably mounted to said device so that the nailing plate dispenser unit can be adjusted to accommodate wooden ties of differing lengths.

7. A device for applying nailing plates to ends of wooden ties, the wooden ties orientated so that the ends are in a generally vertically-orientated position, the device comprising:

- a plate feeder for applying nailing plates to the generally vertically-oriented ends of a wooden tie horizontally disposed therein, the plate feeder including a frame on each side for holding a nailing plate in a generally vertical orientation adjacent one of the ends of the wooden tie, a dispenser associated with each frame for dispensing nailing plates to the frame; and a piston on each side actuable to partially press a nailing plate held in the frame into the ends of the wooden tie, each dispenser comprising a chute configured to turn a generally horizontally disposed nailing plate to a generally vertical orientation and deliver the nailing plate to the frame;
- a tie feeder for conveying ties to the plate feeder;
- a press for pressing nailing plates that have been partially embedded in the ends of a wooden tie, into the ends of the wooden tie;
- and a conveyor for conveying wooden ties from the plate feeder to the press.

8. The device according to claim 7 wherein each frame comprises resilient grippers for releasably holding a nailing plate therein.

9. The device according to claim 7 wherein each dispenser comprises a bin for holding a vertical stack of generally horizontally disposed nailing plates, the bin having a discharge opening at the bottom for discharging nailing plates, and toothed sprockets on opposite sides of the discharge opening, the sprockets engaging the edges of the bottom nailing plate in the stack between the teeth on the sprockets and turning in registration to move the nailing plate out of the bin through the discharge opening.

10. The device according to claim 7 wherein one nailing plate dispenser unit is slidably mounted to said device so that the nailing plate dispenser unit can be adjusted to accommodate wooden ties of differing lengths.

11. A dispenser for dispensing nailing plates in a generally vertical orientation, the dispenser comprising:

a frame with resilient gripper for holding a nailing plate in a generally vertical orientation;

a bin for holding a vertical stack of generally horizontally disposed nailing plates, the bin having a discharge opening at the bottom for discharging nailing plates;

toothed sprockets on opposite sides of the discharge opening, the sprockets engaging the edges of the bottom nailing plate in the stack between the teeth on the sprockets and turning in registration to move the nailing plate out of the bin through the discharge opening; and a chute configured to turn a nailing plate discharged from the opening to a generally vertical orientation and deliver the plate to the frame.

12. A device for applying nailing plates to ends of an elongated wooden member, the wooden member orientated so that the ends are in a generally vertically-orientated position, the device comprising:

a frame adjacent each end of the wooden member, the frame having resilient grippers for holding a nailing plate in a generally vertical orientation;

a bin for holding a vertical stack of generally horizontally disposed nailing plates, the bin having a discharge opening at the bottom for discharging nailing plates;

toothed sprockets on opposite sides of the discharge opening, the sprockets engaging the edges of the bottom nailing plate in the stack between the teeth on the sprockets and turning in registration to move the nailing plate out of the bin through the discharge opening;

a chute configured to turn a nailing plate discharged from the opening to a generally vertical orientation and deliver the plate to the frame.

13. A dispenser for dispensing individual nailing plates from a generally vertical stack of generally horizontally disposed nailing plates into a generally vertical holder for applying the nailing plate to a generally vertical surface, the dispenser comprising:

a bin for holding the generally vertical stack of generally horizontally disposed nailing plates, the bin having a discharge opening in the bottom through which nailing plates can leave the bin;

tooth sprockets on opposite sides of the discharge opening, the teeth of the sprockets engaging the edges of the bottom nailing plate in the stack, the sprockets turning in registration to move the bottom plate in the stack through the discharge opening;

a chute below the discharge opening to rotate the nailing plates moved through the discharge opening to a generally vertical orientation, and deliver the nailing plate to the holder.

14. An applicator for applying nailing plates to a generally vertical surface, the applicator comprising:

a top-loading holder for releasably holding a nailing plate in a generally vertical orientation, adjacent to the vertical surface;

a press for pressing a nailing plate held in the holder into the adjacent vertical surface; and a dispenser for dispensing nailing plates to the holder, the dispenser comprising a bin for holding a generally vertical stack of generally horizontally disposed nailing plates, the bin having a discharge opening in the bottom through which nailing plates can leave the bin; toothed sprockets on opposite sides of the discharge opening, the teeth of the sprockets engaging the edges of the bottom nailing plate in the stack, the sprockets turning in registration to move the bottom plate in the stack through the discharge opening; and a chute below the discharge opening to rotate the nailing plates moved through the discharge opening to a generally vertical orientation, and deliver the nailing plate to the holder.

* * * * *